April 18, 1961     K. H. HOHENEMSER     2,980,364
HORIZONTAL TAIL CONTROL SYSTEM FOR ROTARY WING AIRCRAFT Filed Aug. 24, 1955     2 Sheets-Sheet 1

INVENTOR.
KURT H. HOHENEMSER
BY *Gravely, Lieder,*
*Woodruff & Wills*
ATTORNEYS

INVENTOR.
KURT H. HOHENEMSER
BY Gravely, Lieder
Woodruff & Wills
ATTORNEYS

United States Patent Office 2,980,364
Patented Apr. 18, 1961

2,980,364

HORIZONTAL TAIL CONTROL SYSTEM FOR ROTARY WING AIRCRAFT

Kurt H. Hohenemser, Rock Hill, Mo., assignor to McDonnell Aircraft Corporation, St. Louis, Mo., a corporation of Maryland Filed Aug. 24, 1955, Ser. No. 530,260

13 Claims. (Cl. 244—17.11)

This invention relates to control systems for rotary wing aircraft, and it is particularly directed to a system of means for changing the incidence of aircraft horizontal surfaces for the purpose of improving aircraft flight and control characteristics in cases where abnormal changes in the air flow directed at the tail surfaces occur when varying the aircraft flight speed.

In most aircraft the horizontal tail surface is subject to the downwash from a fixed wing or from a lifting rotor. The downwash angle at the tail increases with angle of attack or with reduced flight speed, thereby producing a destabilizing effect on the aircraft. This destabilization from downwash at the tail is especially pronounced in an aircraft with a lifting rotor. At low flight speed very large downwash angles are developed in the vicinity of the tail, while at higher speed the downwash angle is quite small.

In an aircraft having a lifting rotor, as in a helicopter, the rotor downwash angle is also largely affected by close proximity to the ground. When hovering or flying slowly close to the ground the downwash angle is quite erratic. Small attitude changes of the helicopter change the flow direction at the tail by large angles and change the flow velocity from zero to very appreciable magnitudes. These large changes often occur very suddenly, and produce disturbing pitching moments when the helicopter has conventional horizontal tail surfaces, requiring a high order to skill on the part of the pilot to maintain control.

In spite of the fact that helicopters have been successfully operated without any horizontal tail, it has been found advantageous, in some cases, to add a relatively small horizontal tail in order to improve the dynamic longitudinal stability. It is normally possible to obtain adequate static longitudinal stability, as defined by more forward stick position for increased forward flight speed, from the tendency of the hinged rotor to produce an increasing backward inclination of the thrust vector with increasing flight speed. A few helicopters have been tried out with a relatively large horizontal tail. In these cases, the tail has the bad effect of causing a sizable reduction in the static stability by reason of the rotor downwash angle which changes from large downwash angles in slow speed flight to small downwash angles in cruising flight. Compensation for this destabilizing effect can be obtained to a certain degree by adjusting the horizontal tail incidence for download on the tail. The download increases substantially with the square of the flight speed thus producing a stabilizing longituinal moment on the aircraft. For negative tail incidence, however, the rotor thrust vector must be inclined forwardly by a large angle, the result of which is to reach the forward limit of the stick at a too low flight speed.

The foregoing objectionable effects of a large horizontal tail on the stability characteristics of a helicopter are even more exaggerated when a fixed wing is added. Now, the unloading of the lift rotor by the fixed wing, with increasing forward flight speed, requires more forward inclination of the rotor thrust vector than for the wingless helicopter, and adequate forward control movement is almost impossible to achieve with a sizable download on the tail.

Another objectionable effect of the fixed horizontal tail surface on the flight characteristics of a rotary wing aircraft is the stalling of this surface in low speed flight. In order to be effective for stabilization in cruising flight the tail surface has to be set at zero or negative incidence and the large downwash angles of the flow over the tail surface occurring at low speed produce a stalled flow condition. In flight conditions close to tail stall, erratic longitudinal moments are encountered making control of the aircraft difficult.

A principal object of this invention is to compensate downwash effects on a horizontal tail surface by making the latter change its position in response to forward velocity thereby overcoming the destabilizing effect of the downwash on the horizontal tail.

Another object of the present invention is to reduce or eliminate the stalling of the flow over the horizontal tail surface by making the latter assume a large positive incidence angle of 30 degrees or more at low flight speed of a rotary wing aircraft.

Another object of the invention, when applied to helicopters or convertiplanes, is to reduce or eliminate the disturbances from erratic flow conditions in the vicinity of the tail when hovering or flying slowly close to the ground by making the tail surface assume sufficient large positive incidence angles of 40° or more so that the aerodynamic force on the tail surface has a much reduced moment arm with respect to the aircraft center of gravity thereby reducing the effects of erratic flow over the tail on the longitudinal moments of the aircraft.

Another object of the invention is to improve the stability with speed of an aircraft also in high speed flight where the downwash at the tail from fixed or rotating lifting surfaces is small, thereby allowing the use of smaller horizontal tail surfaces.

The invention consists broadly in combining a servotab controlled freely floating tail surface with means for automatically increasing the incidence of such a surface with reducing flight speed.

Freely floating control surfaces stabilized and controlled in their incidence by an antibalance or servotab have been widely used as ship rudders (Flettner rudders), and have been also occasionally used as airplane control surfaces. The advantage of such an arrangement is that it allows for considerable reduction in control forces, since only the tab with its very small hinge moments is manually operated while the main control surface is moved about its hinge line by the aerodynamic moments produced by deflecting the tab. The invention also consists in improvements over the Flettner rudder type of aircraft horizontal tail to achieve the objects as stated above.

The horizontal tail surface according to the invention should not be confused with other types of freely floating tail surfaces which have been occasionally used on helicopters and where the incidence of the tail surface changes with a change in direction of airflow in a manner similar to the behavior of a weather vane. The Flettner rudder, if properly designed, has very little, if any weathervaning tendencies, and a change in direction of airflow has very little, if any, effect on the position of the surface relative to the aircraft body. The horizontal tail according to the invention automatically changes its incidence with a change of flight speed, however, its incidence remains substantially unchanged during attitude changes of the aircraft. While the weathervaning floating tail surfaces allow the application of longitudinal trim movements to an aircraft they do not contribute to the attitude stability of the aircraft. In contrast the horizontal tail surface according to the invention retains the attitude stability provided by a fixed tail surface and still compensates for the large variations of the flow direction in the vicinity of the tail which occur in certain cases when the flight speed is changed.

In one embodiment of the invention the all movable servotab controlled horizontal tail surface is combined with elastic means tending to deflect the tail surface in the trailing edge down direction. The servo or antibalance tab tends to hold the tail surface in a certain center position given by the position of the control lever to which the servotab is connected. At high flight speeds the centering aerodynamic moments produced by the antibalance tab are large in relation to the elastic moment so that only a small deviation of the tail position from the center position will occur. At low flight speed the centering aerodynamic moments produced by the antibalance tab are small in relation to the elastic moment so that a large deviation of the tail position from the center position in the trailing edge down direction will occur. Thus the horizontal tail assumes at a given control lever position a variety of incidence angles from small angles at high speed to large positive angles at low flight speed.

In another embodiment of the invention the all movable servotab controlled horizontal tail surface is combined with a spring loaded trailing edge tab whereby the spring acting on the spring loaded tab tends to deflect the tab in the up direction. The up deflected spring loaded tab causes a trailing edge down moment on the horizontal tail surface in proportion to the tab deflection. The airflow tends to neutralize the tab deflection and almost overcomes the spring force at high flight speed where the spring loaded tab is only deflected by a small amount. At low flight speed, however, the spring acting on the tab will overpower the aerodynamic moments and produce a large up deflection of the spring loaded tab, hence a large trailing edge down deflection of the horizontal tail surface away from the center position.

In another embodiment of the invention the spring loaded tab is at the same time operated by an antibalance mechanism from a control lever. Otherwise the effect of the spring loaded tab on the horizontal tail incidence is the same as before.

The rate of change of the horizontal tail deflection with flight speed is relatively small in the low speed range and increases with flight speed when a spring loaded tab is used while the reverse characteristics can be obtained when elastic means are used tending to deflect the tail surface in the trailing edge down direction. Therefore, in order to properly compensate for the downwash angle at the tail over the entire flight speed range, it is of special advantage to combine a spring loaded tab with elastic means tending to deflect the tail surface in the trailing edge down direction.

The invention further consists in the parts, combination of parts, control means and combined parts and controls hereinafter described in relation to the embodiments illustrated in the drawings, wherein:

Fig. 1 is a schematic side view of an aircraft embodying the present invention;

Fig. 2 is a graph indicating by the solid line the change of downwash angle at the tail of the aircraft of Fig. 1 with flight speed, the dash line showing for a typical case of the invention the part of the downwash angle compensated by the action of the spring loaded tab, and the dash-dot line showing the part of the downwash angle compensated by elastic means tending to deflect the horizontal tail in the trailing edge down direction;

Figure 1:
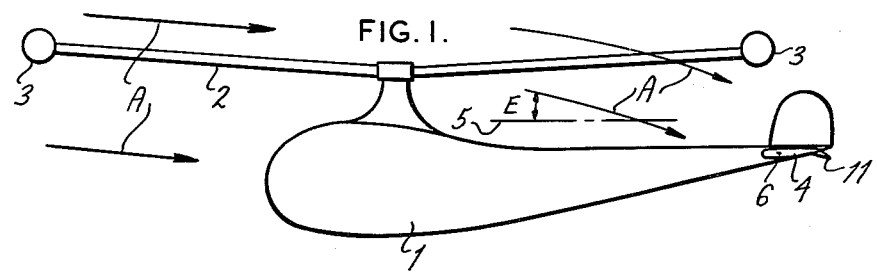

In the drawings the aircraft structure is shown at 1, and a lifting rotor at 2 driven by jet engines 3 mounted at the tips of the blades of the rotor 2. The aircraft structure has a horizontal tail surface 4 which is situated in the field of the downwash produced by the rotor 2, such downwash being indicated by the arrows A. In the flight condition illustrated by Fig. 1, the downwash flow direction in the vicinity of the tail surface 4 forms the angle E with the line 5 which is parallel to the direction of flight.

Figure 2:
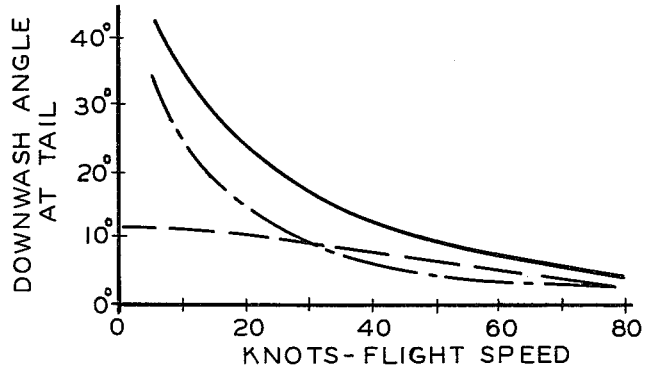

Referring now to Fig. 2, but keeping in mind the characteristics of the structure shown in Fig. 1, the solid line of the graph indicates the relation between the downwash flow angle and the flight speed of the aircraft. It can be seen from the graph that at low speed the downwash angle (which is angle E shown in Fig. 1) is quite large and that this downwash angle decreases to small angular values at higher flight speeds of the aircraft. The dash line of Fig. 2 represents that part of the downwash angle which in a typical case, is compensated by the action of spring loaded tab means. The dash-dot line of Fig. 2 represents that part of the downwash angle which is compensated by an elastic means tending to deflect the horizontal tail in the trailing edge down direction. The sum of these two parts is the solid line which shows that at low speed the elastic means predominates and at high speed the spring loaded tab predominates.

The characteristic relationship brought out by the graph of Fig. 2 is usefully applied to rotary wing aircraft by hingedly connecting the horizontal tail surface 4 so that it is free to swing about suitable hinge means having the axis 6 (Figs. 1 and 4) which is substantially coincident with the aerodynamic axis of the tail surface. The aerodynamic axis is defined as the axis for which at zero tab deflection the aerodynamic moment is zero throughout the usable range of angle of attack.

A convenient arrangement for providing control means for a free floating tail surface, such as the tail surface 4 on the aircraft 1, is shown in Figs. 4 to 9. The tail surface 4 is free to move about the hinge axis 6 relative to the structure of aircraft 1. Surface 4 is provided with a servo-tab 11 arranged at the trailing edge of the surface 4 and a spring loaded tab 12 similarly disposed at the trailing edge. Servotab 11 is suitably hingedly connected to surface 4 so as to pivot about hinge axis 7 and spring loaded tab 12 is likewise suitably connected to surface 4 to move about hinge axis 8. It is not believed necessary to specifically illustrate the physical means by which surface 4 and tabs 11 and 12 are connected for the hinge movement described, as any suitable means may be utilized for this purpose.

Figure 4:
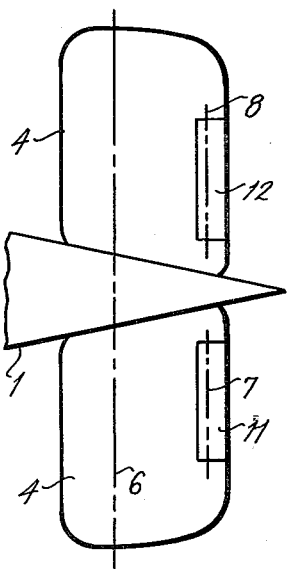
Fig. 4 is a fragmentary plan view of the tail portion of the aircraft shown in Fig. 1.
Figure 5:
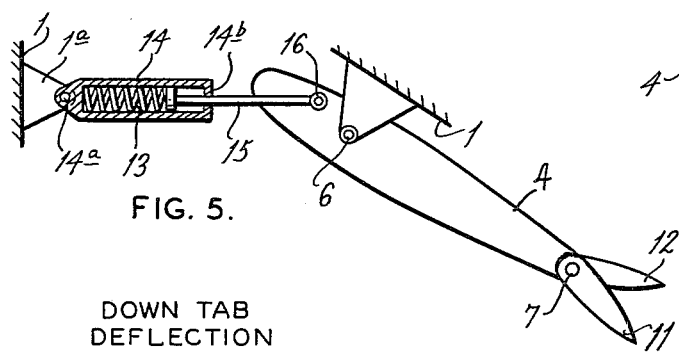
Fig. 5 is a schematic side view, on an enlarged scale, of the tail surface of Fig. 4 excluding the control mechanisms for the servotab and for the spring loaded tab.
Figure 7:
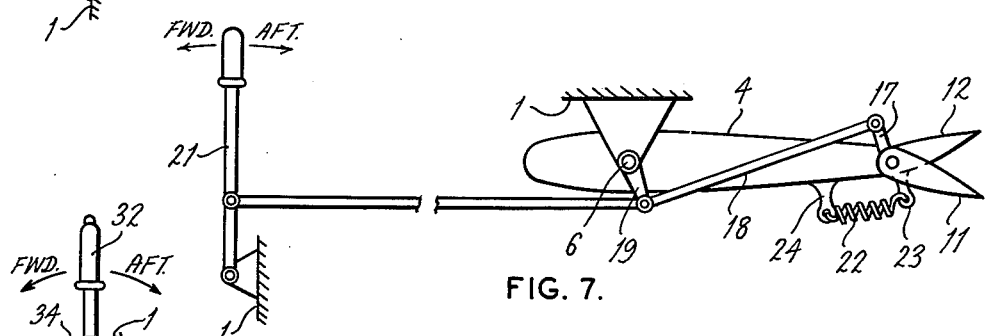
Fig. 7 is a schematic view of a spring loaded tab and of the antibalance and control mechanism for the servotab useful with the tail surface shown in Figs. 4 and 5.
Figure 8:
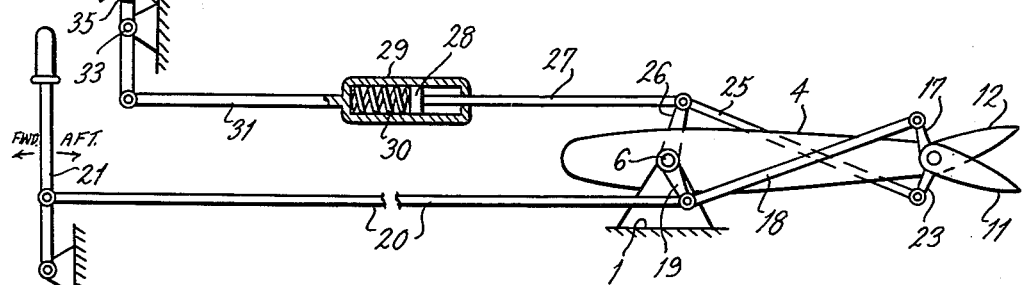
Fig. 8 is a schematic view of the antibalance and control mechanism for the spring loaded tab and for the servotab on the tail surface of Fig. 5.
Figure 9:
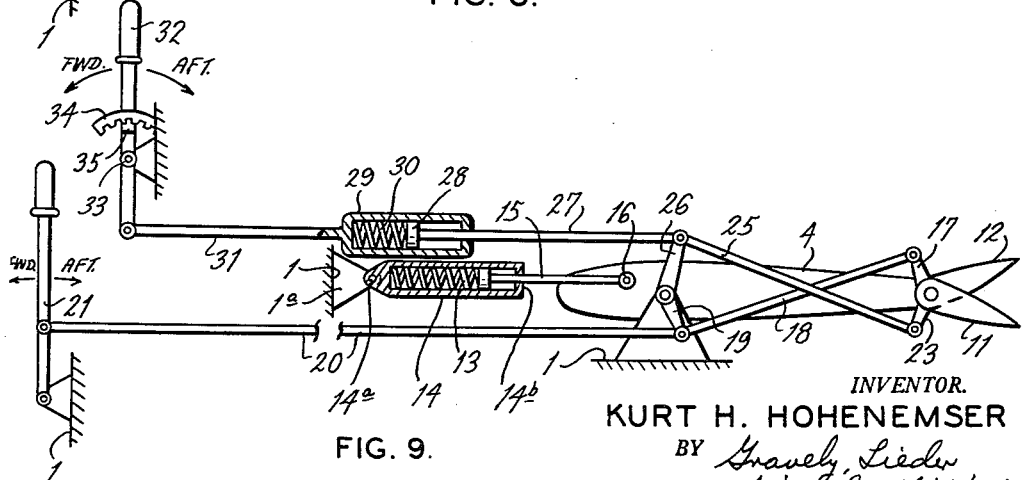
Fig. 9 shows the mechanism of Fig. 8 and the elastic means of Fig. 5 tending to deflect the horizontal tail surface in the trailing edge down direction.

Fig. 5 is a schematic view of the tail surface 4 and servotab 11 and spring loaded tab 12 shown in Fig. 4. The servotab 11 is always deflected downwardly and the spring loaded tab 12 is always deflected upwardly, as is also shown in Figs. 7, 8 and 9. The tail surface 4 is influenced in its pivoting movement about hinge axis 6 by means of a suitable spring 13 contained in a suitable support such as the cartridge 14. The cartridge 14 is pivotally connected at one end portion 14a to a suitable bracket 1a on the aircraft structure 1, and the opposite end portion 14b forms a stop abutment for the inner end of a motion transmitting link 15 movable within the cartridge 14. The link 15 extends therefrom to an outer end connection 16 on the surface 4 so that the force of spring 13 is exerted against the inner movable end of the link 15 in a direction tending to move the tail surface 4 in the trailing edge down direction, as illustrated. The limit of such trailing edge down attitude of surface 4 is reached when the abutment 14b is contacted. The incidence angle of the tail surface 4 at this limit is 40° or more. Spring 13 carries a certain preload so that the abutment 14b is contacted at a certain minimum flight speed. For flight speeds lower than this minimum the horizontal tail remains in fixed position. Because of the large incidence angle of 40° or more the aerodynamic force on the tail surface which is essentially perpendicular to the surface has only a small moment arm with respect to the aircraft center of gravity thus alleviating the effects of erratic flow over the tail at low flight speeds.

Figure 6:
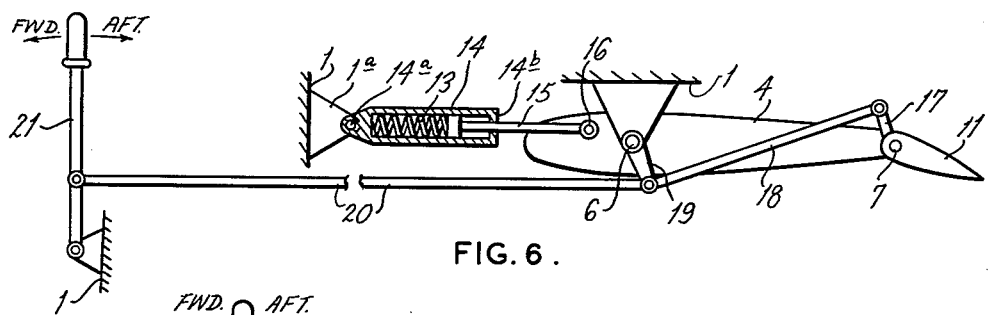
Fig. 6 is a schematic view of the antibalance and control mechanism for the servotab on the tail surface shown in Fig. 5 and of the elastic means tending to deflect the horizontal tail surface in the trailing edge down direction.

In Fig. 6 the servotab 11 is shown provided with a suitable horn 17 to which a push-pull rod 18 is connected. The inner end of rod 18 is pivotally guided by an idler link 19 movable about the hinge axis 6 of the tail surface 4. Another push-pull rod 20 extends from the inner end of push-pull rod 18 to a connection at the pilot's control column or stick 21. The control column or stick 21 is suitably mounted in the aircraft structure 1 so as to be movable in a forward and aft direction. Accordingly, aft motion of the control stick 21 produces a down deflection of the tab 11 when the tail surface 4 is maintained in a fixed position about its hinge axis 6. On the other hand, a trailing edge down motion of the tail surface 4 produces a down deflection of the tab 11 with respect to the tail surface when the control stick 21 is held in a fixed position. A mechanism which produces this relation between tab deflection and tail surface deflection is called antibalance mechanism and it is clear that any suitable mechanism may be utilized in place of the foregoing described antibalance mechanism. Because of the location of the hinge axis of the horizontal tail surface substantially coincident with its aerodynamic axis changes in angle of attack of the tail surface have substantially no effect on the hinge moment. This means that for a given position of the pilot's stick 21 and for a given flight speed the position of the tail surface is substantially independent of the flow direction or aircraft attitude and the freely floating tail behaves essentially as if it were fixed attached to the fuselage. Fig. 6 also shows the elastic means 13 of Fig. 5 tending to deflect the tail in the trailing edge down direction.

In Fig. 7, the tail surface 4 and the spring loaded tab 12 are interconnected by suitable spring means 22 extending between a horn 23 on tab 12 and a suitable support 24 on or in the tail surface 4. Spring means 22 is arranged to move the spring loaded tab 12 with its trailing edge deflected upwardly relative to the surface 4. The spring loaded tab 12 has an effect on the position of the tail surface 4 in the same direction as the spring 13 in Fig. 5 which has been separately shown for clarity in the drawing, and it can be used instead of or in conjunction with spring 13. Both the spring 13 and the spring loaded tab 12 tend to deflect the tail surface from its center position in the trailing edge down direction by an amount which is large at low flight speed and small at high flight speed. However, as has been illustrated in Fig. 2, the rate of change of horizontal tail deflection with change of flight speed is quite small in the low speed range if the spring loaded tab 12 is used, while this rate may be large when spring 13 is used. The reason for this characteristic is that at low speed the tab spring 22 is almost unloaded and changes in speed have only little effect on the tab deflection. The spring 13, however, can, by proper choice of spring force, line of action and point of attachment 16 be designed to produce a change of tail deflection with flight speed which is quite steep in the low speed range as shown by the dash-dot line in Fig. 2.

Figure 3:
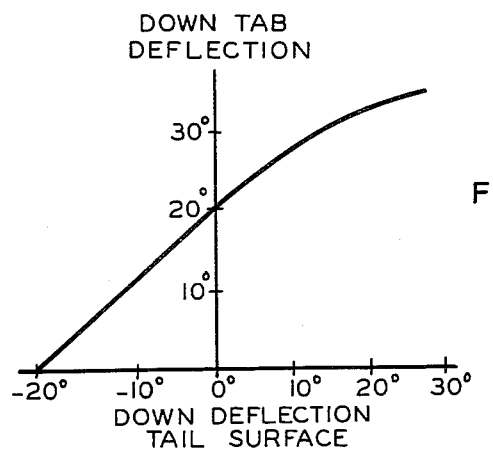
Fig. 3 is a graph showing the relation between down tab deflection and down deflection of the tail produced in a typical case.

For a typical case, the relation between the deflection of the servotab 11 with respect to the tail surface 4 and the deflection of this tail surface 4, assuming neutral position of control stick 21, is shown in Fig. 3. The relationship is such that for zero deflection of servotab 11 with respect to the tail surface 4 this tail surface 4 will have a deflection angle of —20° while for 20° down deflection of the servotab 11 the tail surface deflection will be zero. The deflection of the tail surface 4, also called incidence angle, is measured from a suitable reference line, usually the aircraft structural axis, and the incidence is called positive for trailing edge down deflections and negative for trailing edge up deflections. For deflections of the servotab 11 greater than 20°, the incidence of tail surface 4 will have positive values. Fig. 3 defines the kinematic characteristics of the antibalance mechanism for the servotab 11 in a typical case and other characteristics than those shown in Fig. 3 can be chosen for the present invention.

Another arrangement where the spring loaded tab 12 is also used as means of adjusting the incidence angle of the tail surface 4 from a pilot's trim lever 32 is shown in Fig. 8. The horn 23 on spring loaded tab 12, instead of being directly connected to spring 22, may be actuated by a suitable push-pull rod 25, which rod is connected at the inner end to an idler arm 26 and, in turn, to the outer end of a spring actuated link 27. The inner end of link 27 is connected to a piston or plunger 28 movably arranged in a suitable cartridge 29 so as to be influenced by spring means 30 within the cartridge 29. The cartridge 29 is connected by a link 31 to a suitable pilot's trim control lever 32 movable about a pivot axis 33 to permit the lever 32 to have movement in a forward and aft direction. The lever 32 is provided with a fixed sector 34 and a movable detent 35 for fixing the lever in an adjusted position. The parts 27, 28, 29, 30 and 31 constitute a push-pull rod system in which the cartridge 29 with the spring 30 permits automatic adjustments in the length of the push-pull rod as will become evident. Considering the linkage mechanism heretofore described and also shown in Fig. 8, aft motion of the trim lever 32 produces a down deflection at the spring loaded tab 12 when the tail surface 4 is kept fixed. A trailing edge down movement of the tail surface 4 about its axis 6 produces a down deflection of the spring loaded tab 12 when the trim control lever 32 is kept fixed by the means 34 and 35. The spring loaded tab 12 is set for up deflection and the increasing air pressure at increasing air speeds moves the tab 12 downwardly against the force of spring means 30. Fig. 8 also shows the mechanism for the servotab 11 described in detail for Fig. 6. Fig. 9, on the other hand, shows the antibalance and control mechanism described in Figs. 6 and 8, together with the elastic means described for Fig. 5.

It is now evident from the foregoing description that the tail surface 4 may float about its axis 6 under the aerodynamic forces imposed thereon, but it is controllably subject to certain spring hinge moments introduced by the means of Figs. 5, 7 and 8, and by the pilot's control means of Figs. 6 and 8. Therefore, the destabilizing downwash effect on the usual fixed tail surface is taken care of by the floating characteristics of this tail surface 4 and its consequent response in relation to the change in flight speed. The control system herein set forth acheives the objects stated for it, improves the flight characteristics of the aircraft, and reduces the high degree of pilot skill required heretofore.

The means described herein and shown in the drawings is not to be understood as limiting the types, character or possible combination of means which may be utilized to carry out the principles of the invention, or as restricting the scope of the claims.

What is claimed is:

1. An aircraft comprising an aircraft structure, lifting rotor means supported by said aircraft structure, a stabilizer and elevator horizontal tail consisting solely of a tail surface hingedly connected to said aircraft structure and movable about the axis of the hinge connection to float in response to the relative wind and effect of the down wash from the lifting rotor means, a tab hinged at the trailing edge of said tail surface, antibalance mechanism connected between said tab and said aircraft structure tending to move said tab in the trailing edge down direction with respect to said tail surface when said tail surface is moved in the trailing edge down direction a control column, control linkage connecting said control column to said antibalance mechanism, and elastic means connected to said aircraft structure and to said tail surface tending to move said tail surface about its hinge axis in the trailing edge down direction, said tail surface being otherwise unrestrained and assuming an equilibrium position under the combined action of aerodynamic moments and the moments of said elastic means, this equilibrium position being automatically changed selectively responsive to a change of aircraft flight speed and a change of position of said control column.

2. An aircraft comprising an aircraft structure, lifting rotor means supported by said aircraft structure, a stabilizer and elevator horizontal tail consisting solely of a tail surface hingedly connected to said aircraft structure and movable about the hinge axis to float in response to the relative wind and effects of the down wash from the lifting rotor means, first tab means hinged at the trailing edge of said tail surface, antibalance mechanism connected between said first tab and said aircraft structure and tending to move said tab in the trailing edge down direction with respect to said tail surface when said tail surface is moved in the trailing edge down direction, a control column, control linkage connecting said control column to said anti-balance mechanism, second tab means hinged at the trailing edge of said tail surface, and elastic pre-loading means connected to said second tab and to said tail surface and adapted to rotate said second tab with respect to said tail surface in the trailing edge up direction, said tail surface being otherwise unrestrained and assuming an equilibrum position under the action of the aerodynamic moments thereon, this equilibrium position being automatically changed selectively with a change of aircraft flight speed and with a change of position of said control column.

3. An aircraft comprising an aircraft structure, lifting rotor means supported by said aircraft structure, a stabilizer and elevator horizontal tail consisting solely of a tail surface hingedly connected to said aircraft structure and movable about the hinge axis to float in response to the relative wind and effects of the down wash from the lifting rotor, a first tab hinged at the trailing edge of said tail surface, a first antibalance mechanism connected to said first tab and said aircraft structure and tending to move said first tab in the trailing edge down direction with respect to said tail surface when said tail surface is moved in the trailing edge down direction, a control column linkage connecting said column and said anti-balance mechanism, a second tab hinged at the trailing edge of said tail surface, a second antibalance mechanism connected to said second tab and said aircraft structure and tending to move said second tab in the trailing edge down direction with respect to said tail surface when said tail surface is moved in the trailing edge down direction, elastic pre-loading means in said second antibalance mechanism adapted to rotate said second tab with respect to said tail surface in the trailing edge up direction, said tail surface being otherwise unrestrained and assuming an equilibrium position under the action of aerodynamic moments thereon, this equilibrium position being automatically changed selectively with a change in flight speed and with a change of position of said control column.

4. An aircraft comprising an aircraft structure, lifting rotor means supported by said aircraft structure, a stabilizer and elevator horizontal tail consisting solely of a tail surface hingedly connected to said aircraft structure and movable about the hinge axis to float in response to the relative wind and effects of the down wash from the lifting rotor, a first tab hinged at the trailing edge of said tail surface, a first antibalance mechanism connected between said first tab and said aircraft body and tending to move said first tab in the trailing edge down direction with respect to said tail surface when said tail surface is moved in the trailing edge down direction, a control column, linkage connecting said control column and said anti-balance mechanism, elastic pre-loading means connected to said aircraft structure and to said tail surface and adapted to rotate said tail surface about its hinge axis in the trailing edge down direction, a second tab hinged at the trailing edge of said tail surface, a second antibalance mechanism connected between said second tab and said aircraft structure and tending to move said second tab in the trailing edge down direction with respect to said tail surface when said tail surface is moved in the trailing edge down direction, and elastic pre-loading means in said second antibalance mechanism adapted to rotate said second tab with respect to said tail surface in the trailing edge up direction, said tail surface being otherwise unrestrained and assuming an equilibrium position under the action of the aerodynamic moments thereon, this equilibrium position being automatically changed selectively with a change in flight speed and with a change of position of said control column.

5. An aircraft comprising an aircraft structure, a rotary wing lifting and propelling means supported by said structure, a stabilizer and elevator horizontal tail consisting solely of a movable tail surface having a trailing edge and being hingedly connected to said aircraft structure to freely move about the hinge axis and float in response to down wash from said rotary wings, elastic means connected to said tail surface and said aircraft structure and adapted to move the tail surface in the trailing edge down direction, tab means hingedly connected in the trailing edge of said tail surface, antibalance mechanisms operably connected to said aircraft structure and said tab means, said antibalance mechanisms tending to move said tab means in the trailing edge down direction when said tail surface is moved in the trailing edge down direction, and control elements in said aircraft structure connected to said antibalance mechanisms and adapted through said antibalance mechanisms to adjust said tab means to provide longitudinal control and trim control of said aircraft.

6. The aircraft set forth in claim 5, wherein said elastic means includes an abutment adapted to limit the trailing edge down movement of said tail surface to an angle of incidence of 40° or more.

7. The aircraft set forth in claim 5, wherein one of said antibalance mechanisms includes spring means aadpted to tend to move the tab means connected thereto in a trailing edge up direction with respect to said tail surface.

8. An aircraft comprising an aircraft structure, a rotary lifting and propelling means supported by said structure, a stabilizer and elevator horizontal tail consisting solely of a movable tail surface hingedly connected to said aircraft structure and being unrestrained to assume an equilibrium position under the action of aerodynamic moments said tail surface being free to float under the influence of down wash from the rotary lifting means, servocontrol means connected to said tail surface and said aircraft structure and adapted to impose moments upon said tail surface, said servocontrol means including a plurality of mechanisms, one of which includes spring means urging said tail surface bodily in a trailing edge down direction, and control means in said aircraft structure operably connected to certain of said servocontrol means to provide selective horizontal flight control of the aircraft.

9. An aircraft comprising an aircraft structure, a rotary wing lifting means carried by said structure, a floating tail on said structure and consisting solely of a movable tail surface, means to obtain attitude stability of the aircraft body structure and compensation for large variations of the air flow in the vicinity of the tail surface from forward flight and from the rotary wing, said means comprising pivot means mounting said tail surface on the body structure to freely move about a horizontal axis, pre-loading means operatively associated with said tail surface to tend to move said tail surface about its axis in a trailing edge down direction, and anti-balance mechanism including a tab hinged on said tail surface and tab operating means extending to said body structure to effect movement of said tab independently of said tail surface and to cause said tab to move in a trailing edge down position upon tail surface movement in a trailing edge down position, said pre-loading means and said anti-balance mechanism being free of restraining influence on said tail surface so as not to prevent said tail surface from attaining an equilibrium position automatically with changes in the flight speed of the aircraft.

10. The improvement set forth in claim 9, wherein said pre-loading means associated with said tail surface includes relatively movable parts and an interposed yieldable member.

11. The improvement set forth in claim 9, wherein said pre-loading means and said anti-balance mechanisms are provided with control elements whereby pilot selectivity over the control of the aircraft is obtained.

12. The improvement set forth in claim 10, wherein one of said relatively movable parts includes an abutment to limit the movement of said tail surface to a trailing edge down angle of about 40°.

13. A rotary wing aircraft comprising an aircraft structure, a rotary wing supported by said structure, a stabilizer and elevator horizontal tail consisting solely of a movable tail surface, said tail surface being hingedly connected to said aircraft structure to float in response to the relative wind and the downwash from the lifting rotor, antibalance tab means hinged adjacent the trailing edge of said tail surface and substantially preventing the tail surface from changing its incidence angle with respect to said aircraft structure when the relative wind direction changes, pre-loading means operatively associated with said tail surface to provide a substantially constant trailing edge down moment on the tail surface independent of flight speed and operative to deflect the tail surface trailing edge down when the relative wind velocity decreases.

References Cited in the file of this patent

UNITED STATES PATENTS

| | | |
|---|---|---|
| 2,428,194 | Bockrath | Sept. 30, 1947 |
| 2,438,309 | Zimmerman | Mar. 23, 1948 |
| 2,467,795 | White | Apr. 19, 1949 |
| 2,605,063 | Gilruth | July 29, 1952 |
| 2,718,365 | White | Sept. 20, 1955 |
| 2,813,689 | Norton et al. | Nov. 19, 1957 |
| 2,949,258 | Bell | Aug. 16, 1960 |

FOREIGN PATENTS

| | | |
|---|---|---|
| 100,266 | Sweden | Sept. 12, 1940 |
| 755,256 | Great Britain | Aug. 22, 1956 |